(12) United States Patent
Grey

(10) Patent No.: US 8,709,598 B2
(45) Date of Patent: Apr. 29, 2014

(54) MICROCAPSULES, THEIR USE AND PROCESSES FOR THEIR MANUFACTURE

(75) Inventor: Bryan David Grey, Bradford (GB)

(73) Assignee: BASF SE, Ludwigshafen (DE)

( * ) Notice: Subject to any disclaimer, the term of this patent is extended or adjusted under 35 U.S.C. 154(b) by 377 days.

(21) Appl. No.: 12/513,671

(22) PCT Filed: Nov. 7, 2007

(86) PCT No.: PCT/EP2007/061991
§ 371 (c)(1),
(2), (4) Date: May 6, 2009

(87) PCT Pub. No.: WO2008/061885
PCT Pub. Date: May 29, 2008

(65) Prior Publication Data
US 2010/0003518 A1    Jan. 7, 2010

(30) Foreign Application Priority Data
Nov. 21, 2006    (GB) .................................. 0623110.4

(51) Int. Cl.
*B32B 5/16*    (2006.01)
*B82Y 30/00*    (2011.01)

(52) U.S. Cl.
USPC ... 428/391; 428/402.2; 252/589; 252/389.31; 252/180; 264/4.7

(58) Field of Classification Search
USPC ................. 430/138, 143, 275, 278, 524, 525; 428/391, 402–402.24; 252/589; 427/389.9, 213.3–213.36; 264/4–4.7
See application file for complete search history.

(56) References Cited

U.S. PATENT DOCUMENTS

| | | | |
|---|---|---|---|
| 3,912,792 A | 10/1975 | Touval | |
| 4,105,823 A | 8/1978 | Hasler et al. | |
| 4,368,297 A | 1/1983 | Kato et al. | |
| 4,518,726 A | 5/1985 | Kato et al. | |
| 4,861,539 A | 8/1989 | Allen et al. | |
| 4,971,885 A * | 11/1990 | Hammann et al. | ............ 430/138 |
| 5,320,835 A | 6/1994 | Pahlck et al. | |
| 5,382,433 A | 1/1995 | Pahlck et al. | |
| 5,456,852 A | 10/1995 | Isiguro | |
| 5,498,345 A | 3/1996 | Jollenbeck et al. | |
| 5,508,025 A | 4/1996 | Hoshino et al. | |
| 5,776,651 A * | 7/1998 | Lu et al. | ......................... 430/143 |
| 6,200,681 B1 | 3/2001 | Jahns et al. | |
| 6,716,526 B2 * | 4/2004 | Weston et al. | ............. 428/402.2 |
| 2002/0128367 A1 * | 9/2002 | Daisey et al. | ................. 524/487 |
| 2003/0018102 A1 | 1/2003 | Weston et al. | |
| 2003/0118822 A1 * | 6/2003 | Jahns et al. | ................ 428/402.2 |
| 2003/0170468 A1 | 9/2003 | Paquet, Jr. et al. | |
| 2004/0136933 A1 | 7/2004 | Mistry et al. | |
| 2007/0224899 A1 | 9/2007 | Dungworth et al. | |
| 2007/0264293 A1 | 11/2007 | Elder et al. | |

FOREIGN PATENT DOCUMENTS

| | | |
|---|---|---|
| EP | 0269393 | 6/1988 |
| GB | 1507739 | 4/1978 |
| GB | 2073132 | 3/1981 |
| WO | 9850002 | 11/1998 |
| WO | 99/24525 | 3/1999 |
| WO | 01/54809 | 8/2001 |
| WO | 02/090445 | 11/2002 |
| WO | 03078486 A1 | 9/2003 |
| WO | 2005/105291 | 11/2005 |
| WO | 2006/013165 | 2/2006 |
| WO | 2006/027328 | 3/2006 |
| WO | 2006064628 A1 | 6/2006 |

OTHER PUBLICATIONS

Ke-Fan Ni, et al., Macromolecules 2006, 39, pp. 2529-2535.
Great Britain Search report dated Mar. 23, 2007.

* cited by examiner

*Primary Examiner* — James J Seidleck
*Assistant Examiner* — S. Camilla Pourbohloul
(74) *Attorney, Agent, or Firm* — Shruti Costales

(57) ABSTRACT

A microcapsule comprising a core containing a hydrophobic liquid or wax and a polymeric shell formed from: i) 1 to 20% by weight of polymerizable silane compound, ii) 1 to 94% by weight of hydrophobic mono functional ethylenically unsaturated monomer, iii) 5 to 98% by weight of polyfunctional ethylenically unsaturated monomer, and iv) 0 to 60% by weight of other mono functional monomer(s), wherein components (i), (ii), (iii) and (iv) total 100%, and in which the microcapsule also includes a hydrophilic polymer which is covalently bonded to the microcapsule. The invention includes a process for the manufacture of particles and the use of particles in articles, such as fabrics, and coating compositions, especially for textiles.

22 Claims, No Drawings

MICROCAPSULES, THEIR USE AND PROCESSES FOR THEIR MANUFACTURE

The invention relates to microcapsules that have a core surrounded by a polymeric shell in which the core contains a hydrophobic liquid or a hydrophobic wax. The shell is formed from hydrophobic mono functional ethylenically unsaturated monomer, polyfunctional ethylenically unsaturated monomer and optionally other monomer. In the invention the core may comprise an active ingredient such as ultra violet (UV) absorbers, flame retardants or phase change substances. Desirably the particulate compositions can easily be incorporated into a variety of products such as coatings, sun-screens or a variety of textile products.

There are many instances where it would be desirable to provide capsules comprising a shell surrounding a core material. For instance the core may comprise an active ingredient which is released slowly, such as fragrances, pesticides, medicaments and the like. In other instances it may be desirable for the core material encapsulated within the shell to remain substantially intact either permanently or at least until a suitable trigger induces the core to be released. There are instances where it is important that the core material is not released from the capsules. This includes for example encapsulated ultra violet light absorbers for use in sunscreens and articles of clothing.

Another important application includes encapsulated phase change materials which can be used as thermal energy storage products. Such products include fabrics and especially clothing. Of particular value are for example microcapsules comprising a phase change hydrocarbon material which are combined with a fibre spinning dope, which is then extruded to form filaments which are cured and then collected. Since the spinning process normally requires passing the extruded dope into an environment at temperatures often in excess of say 150 or 200° C. and can be even as high as 350° C. or higher, it is desirable for substantially all of the core material to be retained in the shell. Fibres such as nylon and polyester fibres are produced by melt spun process, which generally involves very high temperatures, for instance in excess of 300 or 350° C. However, it is difficult to find the right chemistry that provides an impervious, durable shell wall that can be incorporated into fibres, without suffering deleterious effects during the spinning process.

Various methods for making capsules have been proposed in the literature. For instance it is known to encapsulate hydrophobic liquids by dispersing the hydrophobic liquid into an aqueous medium containing a melamine formaldehyde pre-condensate and then reducing the pH resulting in an impervious aminoplast resin shell wall surrounding the hydrophobic liquid. Variations of this type of process are described in GB-A-2073132, AU-A-27028/88 and GB-A-1507739, in which the capsules are preferably used to provide encapsulated inks for use in pressure sensitive carbonless copy paper.

However, although capsules based on melamine formaldehyde resins are both impervious and durable, they tend to suffer the disadvantage that they are less impermeable at elevated temperatures. In addition, there is also a risk that formaldehyde is evolved WO-A-9924525 describes microcapsules containing as a core a lipophilic latent heat storage material with a phase transition at −20 to 120° C. The capsules are formed by polymerizing 30 to 100 wt. % C1-24 alkyl ester of (meth) acrylic acid, up to 80 weight % of a di- or multifunctional monomer and up to 40 weight % of other monomers. The microcapsules are said to be used in mineral molded articles. However, the specific polymer compositions described would not be suitable for exposure to high temperatures since the lipophilic phase change material would be very quickly lost. Furthermore, none of the specific polymer compositions are sufficiently strong to withstand high pressures.

US2003118822 describes microcapsules comprising one or more lipophilic substances as core material and a polymeric capsule shell. The lipophilic substances include solid inorganic particles having a mean diameter of between 45 and 1000 nm. The microcapsules are obtained by oil in water emulsion polymerisation of monomers comprising 30 to 100% by weight of C1-C24 alkyl esters of acrylic acid or methacrylic acid with up to 80% by weight of bifunctional or polyfunctional monomer and that is sparingly soluble in water and up to 40% of other monomers. The inorganic particles are said to act as a protective colloid in the stabilisation during the reaction.

WO 2005 002719 describes a method for preparing uniformly sized and shaped microcapsules using a mini emulsion polymerisation. The method employs forming a mini emulsion by mixing a monomer, an emulsifer, an ultrahydrophobe, a low viscosity hydrophobic material, and deionised water. The presence of the ultrahydrophobe is said to stabilise the monomer droplets by osmotic pressure. A long list of possible ultrahydrophobes are suggested including C12 to C20 aliphatic hydrocarbons, C12 to C20 aliphatic alcohols, C12 to C20 alkyl acrylic esters, C12 to C20 alkyl mercaptans, organic dyes, fluorinated alkanes, silicones oil compounds, natural oils, synthetic oils, oligomers with a molecular weight of 1000 to 500,000 and polymers with a molecular weight of 1000 to 500,000. An extensive list of examples are used to illustrate typical ultahydrophobes all of which are monomeric substances.

Ni K. F. et al, *Macromolecules*, 39, 2529-2535 (2006) describes the synthesis of Hybrid Nanocapsules by Miniemulsion (Co)polymerization of Styrene and γ-Methacryloxypropyltrimethoxysilane. The process involves forming an emulsion of styrene monomer and the silane monomer in an aqueous. With the high level of silane monomer employed during the copolymerisation process hydrolysis and polycondensation take place resulting in cross-linking of the alkoxy silane monomer. It is stated that low surfactant concentration is necessary to avoid the existence of micelle nucleation and the authors advise against using a costabilizer cetyl alcohol since this is said to promote homogenous nucleation.

There has been a need for microcapsules that comprise a substantially impervious shell wall that retains a hydrophobic material under conditions of high pressures (generally in excess of 200 psi), especially at elevated temperatures. It would be desirable to provide microcapsules that do not release the hydrophobic core material during the harsh conditions of coating fabrics and after treatment of the coated fabrics. There is also a particular need to provide alternative microcapsules that do not release the core material even when exposed to the harsh conditions, for instance high temperatures during spinning of fibres. There is also a need to achieve all of these objectives but avoiding the use of formaldehyde condensation products.

WO-A-01/54809 provides capsules which can easily be incorporated into fibres without suffering the loss of an active core material during the spinning process. The capsules contain a polymeric shell which is formed from a monomer blend comprising A) 30 to 90% by weight methacrylic acid, B) 10 to 70% by weight alkyl ester of (meth)acrylic acid which is capable of forming a homopolymer of glass transition temperature in excess of 60° C. and C) 0 to 40% by weight other ethylenically unsaturated monomer.

Although significant improvements in core retention are obtained there is a desire to provide alternative microcapsules that do not release the core material when exposed to very harsh conditions including high temperatures during the spinning of fibres. In particular it will be desirable to achieve this when the microcapsules are subjected to elevated pressures.

There is also a requirement for microcapsules that do not release the core material until there has been a suitable release trigger, for instance pH. Nevertheless, the core material would not be released in the absence of the trigger.

There is also a desire to achieve this but at the same time avoiding the use of formaldehyde condensation products.

WO 2005 105291 describes a composition comprising particles which comprise a core material within a polymeric shell, in which the core material comprises a hydrophobic substance. The aforementioned objectives are achieved by using a special combination of features in which the polymeric shell must form at least 8% of the total weight of particles and polymeric shell is formed from a monomer blend that includes 5 to 90% by weight of an ethylenically unsaturated water soluble monomer, 5 to 90% by weight of a multifunctional monomer, and 0 to 55% by weight other monomer and in which the proportions of these monomers are chosen such that the particles exhibit a half height of at least 350° C.

It would be desirable however, to provide microcapsules that also exhibit improved retention of the core material, especially under elevated temperatures and in particular under high pressures. An objective of the present invention is also to achieve this using a greater choice of monomer.

Thus according to the present invention we provide a microcapsule comprising a core containing a hydrophobic liquid or wax and a polymeric shell formed from:
  i) 1 to 20% by weight of polymerisable silane compound,
  ii) 1 to 94% by weight of hydrophobic mono functional ethylenically unsaturated monomer,
  iii) 5 to 98% by weight of polyfunctional ethylenically unsaturated monomer, and
  iv) 0 to 60% by weight of other mono functional monomer(s), wherein components (i), (ii), (iii) and (iv) total 100%,
and in which the microcapsule also includes a hydrophilic polymer which is covalently bonded to the microcapsule.

We find that presence of the hydrophilic polymer that is covalently bonded to the microcapsules and the silane monomer component improves the strength of the microcapsules and furthermore tends to improve the impermeability of the shell thus leading to better retention of the core material. It is believed that the hydrophilic polymer which acts as a stabiliser during the manufacture of particles becomes covalently bonded by reacting with the silane monomer.

The hydrophobic liquid includes hydrophobic substances that are liquid at 25° C.

We have found that the microcapsules of the present invention at an unexpectedly stronger capsule shell compared to microcapsules in the absence of the hydrophilic polymer and silane monomer component. Such a shell resilience is advantageous in terms of withstanding compression for example in the processing of the microcapsules or in the application in the formation of articles and also any harsh treatment of the formed articles.

Also included in the present invention is a process of manufacturing microcapsules comprising a core containing a hydrophobic liquid or wax and a polymeric shell, comprising the steps,
  1) providing a monomer blend comprising,
    i) 1 to 20% by weight of polymerisable silane compound,
    ii) 1 to 94% by weight of hydrophobic mono functional ethylenically unsaturated monomer,
    iii) 5 to 98% by weight of polyfunctional ethylenically unsaturated monomer, and
    iv) 0 to 60% by weight of other mono functional monomer(s),
    wherein components (i), (ii), (iii) and (iv) total 100%,
  2) combining the monomer mixture with the hydrophobic liquid or molten hydrophobic wax to form a monomer solution,
  3) forming an aqueous phase comprising a hydrophilic polymer which is reactive with the silane compound,
  4) homogenising the monomer solution into the aqueous phase containing to form an emulsion,
  5) subjecting the emulsion to polymerisation conditions, and
  6) polymerising the monomer to form a dispersion of microcapsules in the aqueous phase.

In this process the hydrophilic polymer desirably acts as a stabiliser and may for instance be an amphipathic polymeric stabiliser. The hydrophilic polymer is preferably water soluble. It is also preferably a hydroxy containing polymer, for instance a polyvinyl alcohol or hydroxy ethyl cellulose. Generally it is preferred to use polyvinyl alcohol which has been derived from polyvinyl acetate, wherein between 85 and 95%, preferably 90% of the vinyl acetate groups have been hydrolysed to vinyl alcohol units. Other stabilising polymers may additionally be used.

The process may employ an additional material is to promote stability as part of an emulsifying system, for instance emulsifiers, other surfactants and/or other polymerisation stabilisers. Generally stabilisers or emulsifiers should have a high HLB (Hydrophilic Lipophilic Balance) is dissolved into water prior to emulsification of the monomer solution. Alternatively the monomer solution may be emulsified into water with a polymerisation stabiliser dissolved therein.

Other stabilising substances that may be used in the process preferably in addition to the stabilising polymer include ionic monomers. Typical cationic monomers include dialkyl amino alkyl acrylate or methacrylate including quaternary ammonium or acid addition salts and dialkyl amino alkyl acrylamide or methacrylamide including quaternary ammonium or acid addition salts.

Typical anionic monomers include ethylenically unsaturated carboxylic or sulphonic monomers such as acrylic acid, methacrylic acid, itaconic acid, allyl sulphonic acid, vinyl sulphonic acid especially alkali metal or ammonium salts. Particularly preferred anionic monomers are ethylenically unsaturated sulphonic acids and salts thereof, especially 2-acrylamido-2-methyl propane sulphonic acid, and salts thereof.

The polymerisation step may be effected by subjecting the aqueous monomer solution to any conventional polymerisation conditions. Generally polymerisation is effected by the use of suitable initiator compounds. Desirably this may be achieved by the use of redox initiators and/or thermal initiators. Typically redox initiators include a reducing agent such as sodium sulphite, sulphur dioxide and an oxidising compound such as ammonium persulphate or a suitable peroxy compound, such as tertiary butyl hydroperoxide etc. Redox initiation may employ up to 1000 ppm, typically in the range 1 to 100 ppm, normally in the range 4 to 50 ppm.

Preferably the polymerisation step is effected by employing a thermal initiator alone or in combination with other initiator systems, for instance redox initiators. Thermal initiators would include any suitable initiator compound that releases radicals at an elevated temperature, for instance azo compounds or peroxides, such as azobisisobutyronitrile (AZDN), 4,4'-azobis-(4-cyanovalereic acid) (ACVA), t-butyl perpivilate or lauroyl peroxide. Typically thermal initiators are used in an amount of up 50,000 ppm, based on weight of monomer. In most cases, however, thermal initiators are used in the range 5,000 to 15,000 ppm, preferably around 10,000 ppm. Preferably a suitable thermal initiator with the monomer prior to emulsification and polymerisation is effected by heating the emulsion to a suitable temperature, for instance 50 or 60° C. or higher.

The microcapsules of the present invention desirably may have an average particle size diameter is less than 10 microns. Generally the average particle size diameter tends to be much smaller, often less than 2 microns and typically the average particle diameter will be between 200 nm and 2 microns. Preferably the average particle size diameter is in the range 500 nm and 1.5 microns usually around 1 micron. Average particle size is determined by a Sympatec particle size analyser according to standard procedures well documented in the literature.

In general the shell should form at least 5% by weight based on the total weight of microcapsule. Preferably the microcapsule comprises hydrophobic oil or wax forms in an amount between 45 and 95% by weight and the shell in an amount of between 5 and 65% by weight in which all percentages are based on the total weight of the microcapsule.

More preferably the amount of hydrophobic liquid or wax is present in the amount between 60 and 92% by weight of microcapsule and particularly preferably between 70 and 92%, especially between 80 and 90%.

Preferably the shell will form between 8 and 20% by weight of microcapsule and especially between 9 and 15%.

In view of the presence of at least one polyfunctional ethylenically unsaturated monomer the microcapsule shell should be cross-linked. Generally such cross-linking will render a polymeric shell insoluble although the polymeric shell may be capable of absorbing certain solvent liquids provided that the polymeric shell does not dissolve.

Preferably the hydrophobic mono functional ethylenically unsaturated monomer will be present in the monomer mixture in amount between 20 and 70% by weight of monomer mixture. Two or more such hydrophobic monomers may be used so that the combined total of hydrophobic monomer is preferably within this range. Where the hydrophobic mono functional ethylenically unsaturated monomer is used in the absence of other mono functional ethylenically unsaturated monomer it is often desirable to use between 30 and 50%.

Preferably the polyfunctional ethylenically unsaturated monomer or monomers will be present in an amount between 20 and 70% by weight of monomer mixture, particularly between 30 and 60%.

It is not essential for any other mono functional monomer(s) to be present but where this is present it is preferably present in an amount up to 40% by weight of monomer mixture and more preferably between 5 and 20% by weight. Desirably the combined amount of hydrophobic mono functional monomer(s) and other mono functional monomer(s) will be up to 70% by weight, for instance between 30 and 50% by weight.

In some instances it may be desirable to include more than one monomer from each component. For instance it may be desirable to include two or more hydrophobic mono functional ethylenically unsaturated monomers and/or two or more polyfunctional ethylenically unsaturated monomers and/or two or more other mono functional monomers.

The hydrophobic mono functional ethylenically unsaturated monomer may be any suitable monomer that carries one ethylenically group and as a solubility in water are below 5 g per 100 ml of water at 25° C., but usually less than 2 or 1 g/100 cc. Desirably the hydrophobic monomer will include one or more of styrene or derivatives of styrene, esters of mono ethylenically unsaturated carboxylic acids. Preferably the hydrophobic monomer will include alkyl esters of methacrylic acid or acrylic acid. More preferably the hydrophobic monomer is a C1-12 alkyl ester of acrylic or methacrylic acid. Such hydrophobic monomers may include for instance acrylic or methacrylic esters that are capable of forming a homopolymer that has a glass transition temperature (Tg) of at least 60° C. and preferably at least 80° C. Specific examples of these monomers include styrene, methyl methacrylate, tertiary butyl methacrylate, phenyl methacrylate, cyclohexyl methacrylate and isobornyl methacrylate.

Glass transition temperature (Tg) for a polymer is defined in the Encyclopaedia of Chemical Technology, Volume 19, fourth edition, page 891 as the temperature below which (1) the transitional motion of entire molecules and (2) the coiling and uncoiling of 40 to 50 carbon atom segments of chains are both frozen. Thus below its Tg a polymer would not to exhibit flow or rubber elasticity. The Tg of a polymer may be determined using Differential Scanning Calorimetry (DSC).

The polyfunctional ethylenically unsaturated monomer can be any monomer and that induces cross-linking during the polymerisation. Preferably it is a diethylenically unsaturated or polyethylenically unsaturated monomer i.e. carrying two or more ethylenically unsaturated groups. Alternatively the polyfunctional ethylenically unsaturated monomer may contain at least one ethylenically unsaturated group and at least one reactive group capable of reacting with other functional groups in any of the monomer components. Preferably, the multifunctional monomer is insoluble in water or at least has a low water-solubility, for instance below 5 g/100 cc at 25° C., but usually less than 2 or 1 g/100 cc. In addition the multifunctional monomer should be soluble or at least miscible with the hydrocarbon substance of the core material. Suitable multifunctional monomers include divinyl benzene, ethoxylated bisphenol A diacrylate, propoxylated neopentyl glycol diacrylate, tris 2-hydroxyethyl) isocyanurate triacrylate, trimethylolpropane triacrylate and an alkane diol diacrylate, for instance 1,3-butylene glycol diacrylate, 1,6-hexanediol diacrylate but preferably 1,4-butanediol diacrylate.

The other mono functional monomer may be any monomer that has a single polymerisable group. Preferably it will be any ethylenically unsaturated monomer. Typically these other monomers include esters selected from the group consisting of an ethylenically unsaturated carboxylic acid and salts thereof, amino alkyl esters of ethylenically unsaturated carboxylic acid or salts thereof, N-(amino alkyl) derivatives of acrylamide or methacrylamide or salts thereof, other water soluble acrylic monomers including acrylamide, esters of ethylenically unsaturated carboxylic acid, water soluble styrene derivatives, methacrylic acid or salts, acrylic acid or salts, vinyl sulphonic acid or salts, allyl sulphonic acid or salts, itaconic acid or salts, 2-acrylamido-2-methyl propane sulphonic acid or salts, acrylamide and vinyl acetate.

The polymerisable silane compound will desirably comprise at least one ethylenically unsaturated moiety and at least one group linked to the silicon atom through an oxygen atom. This group may for instance be a substituted or unsubstituted alkyl, aryl, alkaryl or aralkyl. Preferably the polymerisable silane compound comprises at least one alkoxy group bonded to the silicon atom.

Preferred silane compounds are defined by formula I

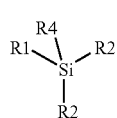

I wherein R1 contains an ethylenically unsaturated moiety, R2 is an alkoxy group and R3 and R4 are each independently the same as R1, R2 or an unsubstituted or substituted alkyl, alkoxy, aryl, alkaryl or aralkyl. In general the ethylenically unsaturated moiety will be bonded directly to the silicon atom through a carbon silicon covalent bond.

The ethylenically unsaturated moiety can be part of any suitable polymerisable group. Preferably it will contain an allylic or acrylic moiety. Suitable groups include vinyl, allyl, methallyl, acryloyl alkyl, methacryloyloxy, acrylamidoalkyl and methcrylamidoalkyl. It is particularly preferred that R1 is methacrylamidoalkyl especially where the alkyl group has between two and four carbon atoms, especially propyl.

Preferably R2, R3 and R4 are lower alkyl oxy groups and in particular they are each independently selected from $C_{1-5}$ alkoxy groups, especially methoxy groups.

Suitable silane compounds are available commercially for example from Dow Corning or Powder Chemical Company of China. A suitable ethylenically unsaturated silane compound includes Z-6030 available from Dow Corning. Ethylenically unsaturated silanes, for instance vinyl silanes or acrylic silanes may be prepared by reacting a halogenated silane compound with a halogenated ethylenically unsaturated compound in a non protic solvent, for instance as described in WO 2006/064628. Typical acryloyl silane and other ethylenically unsaturated silane compounds are also described in WO 03/078486. The ethylenically unsaturated silane compounds can also be synthesised by reacting acetylene, allyl acrylate, allyl methacrylate or diallyl phthalate with methyl dimethoxy silane, methyl dichlorosilane, trimethoxy silane or trichlorosilane in the presence of a Group VIII transition metal catalyst as described in U.S. Pat. No. 4,368,297 or U.S. Pat. No. 4,518,726.

The hydrophilic polymer can be covalently bonded to the microcapsule by any suitable means. In one instance the hydrophilic polymer will have a functional group which has been reacted with a suitable group at the surface of the microcapsule. The hydrophilic polymer may conveniently have been reacted with a functional group of one of the monomer components. Preferably the hydrophilic polymer is a polymer which is reactive with the silane compound such that the resulting microcapsule contains the hydrophilic polymer that has been reacted with the silane so that the hydrophilic polymer is covalently bonded to the microcapsule through the silane component.

In the process of manufacturing the microcapsule in which the monomer blend is emulsified into water the silane monomer component preferably will tend to react with the water by hydrolysis such that the one or more alkoxy groups, R2 and optionally R3 and/or R4 hydrolyse to form a hydroxy group and the corresponding alcohol as the leaving group. Where the silane contains two or more alkoxy groups they will usually give rise to the corresponding number of hydroxy groups bonded to the silicon atom. In some cases where the hydrolysis product of silane contains two or more hydroxy groups there may be some condensation between these hydrolysis products resulting in two or more monomer units combining. However, in general at least some of the hydrolysed silane monomer remain as individual monomer units. This hydrolysed silane monomer, or condensation product thereof, will preferably react with the hydrophilic polymer. Preferably the hydrophilic polymer will contain hydroxy groups and react through the respective hydroxy groups by condensation such that the hydrophilic polymer is covalently bonded to the hydrolysed silane monomer component.

Usually the hydrophilic polymer will be a stabilising polymer used in the synthesis of the microcapsule to achieve stability. During the microcapsule formation at least a portion of this hydrophilic polymer will tend to remain at the interface between the dispersed hydrophobic phase and the continuous aqueous phase. Consequently the hydrophilic polymer which is desirably reacted with the silane monomer components becomes covalently bonded with the microcapsule. The hydrophilic polymer therefore tends to be covalently bonded to the outer surface of the microcapsule. Typically the hydrophilic polymer will form at least a partial coating on the outer surface of the microcapsule. In some cases this coating may be a coherent layer over the outer surface of the microcapsule and may even form a complete coating.

Typically the amount of hydrophilic polymer will be usually at least 0.2% based on the weight of microcapsule and is frequently higher for example up to 40% or higher. Often the hydrophilic polymer will be present in an amount of at least 5% by weight of the polymeric shell component and is usually much higher than this, for instance up to 50%. Preferably the amount of hydrophilic polymer will be within the range of 10 and 45% by weight, usually between 20 and 40% by weight.

Other stabilising substances which may be included and may be located at the outer surface of the microcapsule include polymers of one or more water soluble anionic and water soluble cationic monomers as described above.

The microcapsules of the present invention comprises a core within a polymeric shell, in which the core comprises a hydrophobic liquid or wax as at least part of a core material. Other materials may be included in the core, for instance additives which modify the properties of the hydrophobic liquid or wax. The other materials present in the core material may be hydrophilic and suspended in the hydrophobic liquid or wax, for instance inorganic salt hydrates. Alternatively the other additives may be polymeric additives which are miscible or soluble in the hydrophobic substance. Generally where included in the core these other materials will form no more than 10% by weight of the total core material. Often the other materials form less than 5% of the core normally less than 2%, for instance 0.5 to 1.5%. Thus the core will generally comprise at least 90% of hydrophobic liquid or wax. Preferably the amount of hydrophobic liquid or wax comprised in the core will be more than 95% by weight, more preferably more than 98%, in particular 98.5 to 99.5% and could be 100%.

The core material may comprise an active ingredient selected from the group consisting of UV absorbers, UV reflectors, flame retardants, active dye tracer materials, pigments, dyes, colorants, enzymes, detergent builders and fragrances. Generally within the context of the present invention it would be unnecessary for the active ingredient to be released. For instance encapsulated pigments may be used in pigmented articles, such as ceramics, where it would be important for the pigment not to be released. There is also an application for encapsulated colorants, i.e. dyes and pigments for many other applications, for instance in preparing textile products. Thus the microcapsules comprising a pigment or dye can be incorporated into or adhered to a fibre or textile article. The colour would be held by the microcapsules and there would be no risk of colour leaching. Alternatively the encapsulated colorant may be applied to packaging materials, for instance food packaging. Thus shaded paper or board used in food packaging may be prepared by including the encapsulated pigments or dyes into the paper making process. Typically the colorants can be C.I. Pigment Violet 19, C.I. Pigment Blue 15, C.I. Pigment Blue 60, C.I. Pigment Red 177 as described in WO-A-00/61689

Alternative applications of encapsulated pigments includes cosmetics, for instance as described in U.S. Pat. No. 5,382,433, U.S. Pat. No. 5,320,835 or WO-A-98/50002. Typically the colorants can be mica, talc, D&C Red 7 Calcium Lake, D&C Red 6 Barium Lake, Iron Oxide Red, Iron Oxide Yellow, D&C Red 6 Barium Lake, Timiron MP-1001, Mineral (Carnation White), Helindon Pink, Red 218, Japan Blue No. 1 Al lake, Polysiloxane-treated Titanium mica.

Generally the hydrophobic liquid or wax comprised in the core may be an organic material. For instance the hydrophobic liquid may be an oil or a molten wax. Preferably the hydrophobic substance is a non-polymeric material. More preferably the hydrophobic liquid or wax is a hydrocarbon. The oil or wax may contain active materials, such as UV absorbers, UV reflectors, or flame retardants dispersed or dissolved therein. Thus the core material may a homogenous or alternatively may comprise a dispersion of solid active material dispersed throughout a continuous core medium of hydrophobic substance. When the core material comprises a phase change material, generally the phase change material is an oil or a wax which is liquid at a temperature between −30° C. and 150° C.

Typical examples of flame retardants suitable for the present invention include bromobenzoates as described in U.S. Pat. No. 5,728,760 and halogenated phosphates, thiophosphates or thiophosphoryl chlorides as given in U.S. Pat. No. 3,912,792.

Suitable ultra violet light absorbers of the present invention include naphthalene-methylenemalonic diesters, for instance as mentioned in U.S. Pat. No. 5,508,025 or compositions comprising mixtures of benzotriazoles and 2-hydroxy benzophenones as claimed by U.S. Pat. No. 5,498,345.

When the core material is a phase change substance it may be for instance any known hydrocarbon that melts at a temperature of between −30 and 150° C. Generally the substance is a wax or an oil and preferably has a melting point at between 20 and 80° C., often around 40° C. Desirably the phase change substance may be a $C_{8-40}$ alkane or may be a cycloalkane. Suitable phase change materials includes all isomers of the alkanes or cycloalkanes. In addition it may also be desirably to use mixtures of these alkanes or cycloalkanes. The phase change material may be for instance any of the compounds selected from n-octadecane, n-tetradecane, n-pentadecance, n-heptadecane, n-octadecane, n-nonadecane, n-docosane, n-tricosane, n-pentacosane, n-hexacosane, cyclohexane, cyclooctane, cyclodecane and also isomers and/or mixtures thereof.

In a preferred form of the invention the core consists essentially of a hydrophobic substance, for instance at least 90%, which is a non-polymeric material, for instance an oil or wax, in particular a phase change material. Although the preferred hydrophobic substance is a phase change material which is essentially non-polymeric, it is within the scope of the present invention for a smaller amounts of polymeric additives to be included within the phase change non-polymeric material. Usually this will be in amounts of less than 10% by total weight of core and often will be less than 5, for instance 0.5 to 1.5 or 2% by weight. A particularly desirable polymeric additive is a substance that will modify the properties of the phase change material. For instance it is known that the temperature at which a phase change material melts on absorbing heat can be significantly different from the temperature at which it solidifies when losing heat. Thus a particularly desirable polymeric additive would be a substance which will bring the melting and solidifying temperatures closer together. This minimisation of the shift in melting/freezing point of the phase change material may be important in various domestic applications or for garments.

Alternatively the phase change material comprised in the core could be a substance other than a hydrocarbon.

The phase change material could be an inorganic substance that absorbs and desorbs latent heat during a liquifying and solidifying phase transition. The inorganic substance may be a compound which releases or absorbs heat during a dissolving/crystallisation transition. Such inorganic compounds include for instance sodium sulphate decahydrate or calcium chloride hexahydrate. Thus the inorganic phase change material may be any inorganic substance that can absorb or desorb thermal energy during a transition at a particular temperature. The inorganic phase change material may be in the form of finely dispersed crystals which are dispersed throughout the core matrix which comprises a hydrophobic substance. In one form the inorganic phase change material is dispersed throughout a solid hydrophobic substance such as a wax.

Alternatively the hydrophobic substance comprised in the core remains substantially liquid and contains crystals of the inorganic phase change material dispersed throughout the liquid. Preferably the hydrophobic liquid is a hydrocarbon. During a phase change the crystals become liquid droplets dispersed throughout the liquid. It may be advantageous to include a suitable surfactant, such as a water in oil emulsifier into the hydrophobic liquid in order to prevent coalescence of the dispersed droplets of liquid. Preferably the inorganic phase change material is dispersed throughout a matrix of hydrocarbon phase change material which is a wax or an oil. In this preferred embodiment the hydrocarbon and inorganic materials may both absorb or desorb heat. Alternatively the hydrocarbon phase may be a carrier oil that is not necessarily a phase change material. In this instance the carrier oil may be a process aid.

When the hydrophobic liquid or wax is a phase change material used for thermal storage in may be used in conjunction with a suitable nucleating agent to prevent supercooling, for instance as described in U.S. Pat. No. 5,456,852 or for instance in International patent application PCT/EP 2006/066934 unpublished at the date of filing of the present application.

The microcapsules of the present invention may be used in a variety of applications including textiles (for instance within the body of the fibre or alternatively coating the fibre or textile), automotive applications (including use in circulatory cooling fluids or a coolant within the interior design), construction industry (for instance in passive or active ventilation systems), or heat transfer fluids (as a capsule within a modified heat transfer fluid). It is possible to incorporate the microcapsules of the present invention into any suitable article, for instance fibres, textile products, ceramics, coatings etc. Thus a further aspect of the present invention we provide an article comprising microcapsules. Hence according to the invention it is possible to provide an article which comprises encapsulated flame retardants, UV absorbers, active dye tracer materials or phase change material. In the case of encapsulated flame retardants it would be desirable for the flame retardant to be retained during any processing steps such as fibre formation.

Thus in a further aspect of the present invention we provide an article comprising microcapsules each comprising a core containing a hydrophobic liquid or wax and a polymeric shell formed from:
  i) 1 to 20% by weight of polymerisable silane compound,
  ii) 1 to 94% by weight of hydrophobic mono functional ethylenically unsaturated monomer,
  iii) 5 to 98% by weight of polyfunctional ethylenically unsaturated monomer, and
  iv) 0 to 60% by weight of other mono functional monomer(s),
wherein components (i), (ii), (iii) and (iv) total 100%, and in which the microcapsule also includes a hydrophilic polymer which is covalently bonded to the microcapsule.

The article may be a textile product or a paper or board packaging material or a shaped mineral article. Furthermore, it is possible to provide an article which comprises encapsulated flame retardants, UV absorbers, active dye tracer materials or phase change material. In the case of encapsulated flame retardants it would be desirable for the flame retardant to be retained during any processing steps such as fibre formation, involving temperatures of for instance, between 150° C. to about 350° C. but then released when exposed to the excessive temperatures in excess of say above 400 or 500° C. In a preferred embodiment of the invention the microcapsules comprise a core material that contains both a phase change material, which is a wax or an oil and dispersed or dissolved therein a flame retarding substance. Thus in one preferred form of the invention the presence of the flame retardant in the capsule would prevent or reduce the risk of phase change material from igniting if released under excessive temperatures.

In a further aspect of the present invention we provide a coating composition comprising microcapsules each comprising a core containing a hydrophobic liquid or wax and a polymeric shell formed from:
  i) 1 to 20% by weight of polymerisable silane compound,
  ii) 1 to 94% by weight of hydrophobic mono functional ethylenically unsaturated monomer,
  iii) 5 to 98% by weight of polyfunctional ethylenically unsaturated monomer, and
  iv) 0 to 60% by weight of other mono functional monomer(s),
  wherein components (i), (ii), (iii) and (iv) total 100%,
and in which the microcapsule also includes a hydrophilic polymer which is covalently bonded to the microcapsule.

The coating composition may be used for any suitable substrate, such as paper, wood, metal, plastics, ceramics and the like. Preferably the composition is for coating a textile and can for instance be a polyurethane or polyacrylic textile coating composition. Typically, the coating composition of the present invention is prepared by combining the particulate composition of the present invention with a conventional coating composition (e.g. acrylic or polyurethane textile coating composition) which comprises conventional ingredients used in conventional amounts. The coating composition is a formulation which is desirably prepared by mixing between 30 and 90% by weight of the dry particulate microcapsules of the present invention and between 10 and 70% by weight of a conventional polyurethane or polyacrylic textile coating composition. Preferably the coating formulation comprises between 60 and 80% by weight dry microcapsules and between 20 and 40% by weight of the conventional polyurethane or polyacrylic textile coating composition. A particularly preferred coating formulation is prepared containing 70% of the dry capsule and 30% of a polyurethane or polyacrylic textile coating.

We also provide a process of coating a fabric comprising the steps of
  A) providing a textile coating composition,
  B) applying the coating composition to a surface of the fabric, and
  C) drying the coating to provide a coated fabric,
in which the coating composition comprises a particulate composition which comprises microcapsules each comprising a core containing a hydrophobic liquid or wax and a polymeric shell formed from:
  i) 1 to 20% by weight of polymerisable silane compound,
  ii) 1 to 94% by weight of hydrophobic mono functional ethylenically unsaturated monomer,
  iii) 5 to 98% by weight of polyfunctional ethylenically unsaturated monomer, and
  iv) 0 to 60% by weight of other mono functional monomer(s),
  wherein components (i), (ii), (iii) and (iv) total 100%,
and in which the microcapsule also includes a hydrophilic polymer which is covalently bonded to the microcapsule.

Typically the composition comprising the dry microcapsules of the invention and conventional textile coating, for instance as described above, is prepared and where required stirred for sufficient time to distribute the microcapsules throughout the coating composition, for example 10 minutes, and then substantially immediately coated onto the fabric. The fabric may be a woven fabric or alternatively can be a non-woven fabric. Usually the coating applied to the fabric would be at least 50 g/m$^2$ and may be as much as 180 g/m$^2$. Generally a coat weight of 80 to 120 g/m$^2$, especially around 100 g/m$^2$ is usually desired. Typically in the laboratory, the coating can be applied using many different well known techniques used in industry. The coating can be applied using a k-bar. The coated fabric can then be dried in a suitable drying apparatus, for instance at a temperature of between 100° C. and 200° C. for up to 10 minutes to dry and cure the coating. Generally the coated fabric may be calendared using in excess of 200 psi (e.g. 250 psi) pressure In order to demonstrate that the active material is retained within the capsules in the coated fabric, microcapsules can be incorporated into a textile coating formulation, coated on to fabric and then calendared using in excess of 200 psi (e.g. 250 psi) pressure then subjected to continuous heating and cooling (thermocycling) above and below the melting temperature of the wax, and for instance for octadecane this can be from 10° C. to 60° C. for 50 times. The coated fabric can then be washed using a hydrocarbon solvent e.g. hexane and the enthalpy of the coated microcapsules is measured using Differential Scanning Calorimetry. This is compared to the enthalpy of the original coated capsules before calendaring and continuous heating and cooling has taken place.

Further articles according to the invention include fibres and fabrics formed from said fibres, wherein the fibres comprise microcapsules each comprising a core containing a hydrophobic liquid or wax and a polymeric shell formed from:
  i) 1 to 20% by weight of polymerisable silane compound,
  ii) 1 to 94% by weight of hydrophobic mono functional ethylenically unsaturated monomer,
  iii) 5 to 98% by weight of polyfunctional ethylenically unsaturated monomer, and
  iv) 0 to 60% by weight of other mono functional monomer(s),
  wherein components (i), (ii), (iii) and (iv) total 100%,
and in which the microcapsule also includes a hydrophilic polymer which is covalently bonded to the microcapsule.

In this aspect of the invention the fibres comprise said microcapsules distributed within the matrix of the fibre. Generally the diameters of the microcapsules should be less than half of the cross-sectional diameter of the fibre. Generally, if the microcapsules are much larger there is a risk that the presence of such large capsules in the fibres could result in the fibres which tend to break at the position of the microcapsule. Typically the microcapsules will have a particle size diameter less than 30%, preferably less than 10% of the diameter of the fibre.

The fibres comprising the microcapsules of the present invention can be made by incorporating the microcapsules into the spinning dope. The spinning dope can then be spun according to standard spinning techniques, for instance as described in EP-A-269393. Generally the spinning dope is then passed through an orifice into a heated atmosphere where the extruded dope is cured to form a fibre, which is then collected.

The microcapsules comprised in the composition of the present invention are suitable for incorporating into any fibres, for instance acrylics, polyesters, nylon, polypropylene.

According to this aspect of the invention we provide a process of forming a fibre containing microcapsules comprising the steps of,
1) combining said microcapsules with a liquid spinning dope,
2) extruding the spinning dope,
3) passing extruded dope through an atmosphere at a temperature of at least 150° C. and
4) collecting formed fibres,
wherein the microcapsules a core containing a hydrophobic liquid or wax and a polymeric shell formed from:
  i) 1 to 20% by weight of polymerisable silane compound,
  ii) 1 to 94% by weight of hydrophobic mono functional ethylenically unsaturated monomer,
  iii) 5 to 98% by weight of polyfunctional ethylenically unsaturated monomer, and
  iv) 0 to 60% by weight of other mono functional monomer(s),
  wherein components (i), (ii), (iii) and (iv) total 100%,
and in which the microcapsule also includes a hydrophilic polymer which is covalently bonded to the microcapsule.

Desirably the polymeric microcapsules are sufficiently impermeable to the hydrophobic substance contained in the core so that during the formation of the fibre the high temperature conditions do not result in any significant loss of the hydrophobic liquid or wax. We have surprisingly found that the core material is able to retain most or all of the core material even when the polymeric microcapsules are exposed to a spinning temperature in excess of 150° C. This has also been found to be the case even when the spinning temperature is much higher, for instance in excess of 200° C. Thus we find that the microcapsules retain at least 98% by weight, preferably 99%, of the hydrophobic substance when passed though the spinning process.

A particularly important application of the present invention relates to incorporation of the capsules in fibres, which microcapsules contain a phase change substance as the core material. The durability and impermeability of the polymeric shell towards the phase change material enables the microcapsules to be incorporated into fibres without any significant loss of the phase change material. The impregnated fibres containing phase change material can then be woven into textile products. The textile products can include items of clothing and other fabrics.

The following are examples.

EXAMPLES

Example 1

Hydrophobic Oil (Containing Added Silane Monomer) Microencapsulation: Poly(Vinyl Alcohol Stabilised)

An oil phase is prepared by mixing styrene 4.94 g, methacrylic acid 2.3 g, Silane 2 g (γ-Methacryloxypropyltrimethyloxysilane ex Dow Corning Z-6030) and butane diol diacrylate 7.89 g. Alperox LP 1.4 g (ex ELF Atochem) is added followed by hydrophobic liquid 152 g.

An aqueous phase is prepared by mixing poly(vinyl alcohol) 5.4 g (Gohsenol GH20R ex Nippon Gohseii), water 169 g and Sodium salt of 2-acrylamido-2-methyl propane sulphonic acid 0.64 g (50% active Lubrizol, France).

The aqueous phase and the oil phase are warmed to 40° C. and emulsified together using a Silverson L4R laboratory homogeniser. After ten minutes a stable emulsion was obtained.

The resultant emulsion is poured into a reaction vessel, equipped for polymerisation, situated in a water bath at 75° C. This temperature is maintained for three hours and an aqueous ammonium persulphate solution (0.6 g in 10 g water) is added. The polymerising mass is heated to 80° C. and after stirring at this temperature for two hours, cooled to room temperature to yield the final product. The final product is a dispersion of hydrophobic cored, polymer shelled microcapsules in water of an average particle size of 2.5 microns.

Example 2

Hydrophobic Oil (Containing Added No Silane Monomer) Microencapsulation Poly(Vinyl Alcohol Stabilised)

An oil phase was prepared by mixing styrene 4.94 g, methacrylic acid 2.3 g, and butane diol diacrylate 7.89 g. Alperox LP 1.4 g (ex ELF Atochem) is added followed by hydrophobic liquid 152 g.

An aqueous phase is prepared by mixing poly(vinyl alcohol) 5.4 g (Gohsenol GH20R ex Nippon Gohseii), water 169 g and Sodium salt of 2-acrylamido-2-methyl propane sulphonic acid 0.64 g (50% active ex Lubrizol, France).

The aqueous phase and the oil phase are warmed to 40° C. and emulsified together using a Silverson L4R laboratory homogeniser. After ten minutes a stable emulsion is obtained.

The resultant emulsion was poured into a reaction vessel, equipped for polymerisation, situated in a water bath at 75° C. This temperature is maintained for three hours and an aqueous ammonium persulphate solution (0.6 g in 10 g water) is added. The polymerising mass is heated to 80° C. and after stirring at this temperature for two hours, cooled to room temperature to yield the final product. The final product is a dispersion of hydrophobic cored, polymer shelled microcapsules in water of an average particle size of 2.5 microns.

Example 3

Hydrophobic Oil (Containing Added Silane Monomer) Microencapsulation: Non Poly(Vinyl Alcohol Stabilised)

An oil phase is prepared by mixing styrene 4.94 g, methacrylic acid 2.3 g, Silane A-174 2 g (γ-Methacryloxypropyltrimethyloxysilane ex Dow Corning Z-6030) and butane diol diacrylate 7.89 g. Alperox LP 1.4 g (ex ELF Atochem) is added followed by hydrophobic liquid 152 g.

An aqueous phase is prepared by mixing sodium dodecyl sulphonate 4 g, water 169 g and Sodium salt of 2-acrylamido-2-methyl propane sulphonic acid 0.64 g (50% active ex Lubrizol, France).

The aqueous phase and the oil phase are warmed to 40° C. and emulsified together using a Silverson L4R laboratory homogeniser. After ten minutes a stable emulsion is obtained.

The resultant emulsion is poured into a reaction vessel, equipped for polymerisation, situated in a water bath at 75° C. This temperature is maintained for three hours and an aqueous ammonium persulphate solution (0.6 g in 10 g water) is added. The polymerising mass is heated to 80° C. and after stirring at this temperature for two hours, cooled to room temperature to yield the final product.

The final product is a dispersion of containing traces of unencapsulated material at the surface.

Analysis

Particle Size

Particle size analysis was carried out using a Sympatec Analyser (ex Sympatec GmbH) set up with a Quixcel dispersion system and R4 lens.

Thermo-Gravimetric Analysis (TGA)

Thermo-gravimetric analysis was conducted using a Perkin Elmer TGA with a temperature range of 110° C. to 500° C.

Results:

1: Effect of Silane Addition (Poly(Vinyl Alcohol) Stabilised.

TABLE 1

| Silane level in shell | Methacrylic acid level | Particle Size/ μm | | TGA | |
|---|---|---|---|---|---|
| | | | | Half- | Mass Loss |
| | | | | height | at 300° C. |
| % | (%) | $D_{50}$ | $D_{90}$ | (° C.)[1] | (%)[2] |
| 0 | 3.5 | 2.3 | 11.5 | 299 | 49.9 |
| | 11.5 | 1.9 | 5.0 | 334 | 11.2 |
| 5 | 3.5 | 2.0 | 5.0 | 318 | 21 |
| | 11.5 | 2.5 | 5.5 | 404 | 2.8 |
| | | 1.9 | 3.9 | 369 | 7.5 |
| 9.5 | 3.5 | 33.0 | 7.5 | 306 | 47 |
| | 11.5 | 3 | 7.6 | 360 | 6.7 |
| 17.4 | 11.5 | 2.5 | 5.4 | 361 | 6.4 |
| | | 2.1 | 6.5 | 372 | 4.4 |

[1]Half height: this is the half-height of the decay curve.
[2]Mass loss @ 300° C.: this is the amount of material lost (expressed as a percentage) from the sample between the starting condition, 110° C., and 300° C.

The effect of Silane introduction can been seen by comparison of the half-height values in the table—the higher the half-height, the more resistant the microcapsules to rupture due to build up of internal pressure i.e. the more robust the wall. Taking the higher level of acid inclusion, the addition of a Silane increased the half height from 334° to >360° whilst simultaneously reducing the mass loss to between 4 and 7%.

2: Effect of Silane Addition: Stabiliser Variation.

TABLE 2

| | Silane level in shell | Methacrylic acid level | Particle Size/ μm | | TGA | |
|---|---|---|---|---|---|---|
| | | | | | Half- | Mass Loss at |
| Stabiliser | % | g | $D_{50}$ | $D_{90}$ | height (° C.)[1] | 300° C. (%)[2] |
| Sodium dodecyl sulphonate | 9.5 | 3.5 | ## | ## | 240 | 80 |
| | | 11.5 | ## | ## | 242 | 89 |
| Sodium dodecyl benzene sulphonate | 9.5 | 11.5 | ## | ## | 250 | 88 |
| Poly (vinyl alcohol) | 9.5 | 3.5 | 33.0 | 7.5 | 306 | 47 |
| | | 11.5 | 3 | 7.6 | 360 | 6.7 |

[1]Half height: this is the half-height of the decay curve.
[2]Mass loss @ 300° C.: this is the amount of material lost (expressed as a percentage) from the sample between the starting condition, 110° C., and 300° C.
- measurement unable to be made due to unencapsulated material interference As can be seen from the results, in the absence of poly (vinyl alcohol) stabiliser the addition of Silane does not result in an effective wall being formed—the capsules are prone to high mass loss even under moderate heating. This also provides evidence for there being an interaction between the PVOH and the Silane as both SDS and SDBS are capable of forming stable emulsions at the level used.

3: Effect of Silane Addition: Wall Composition Variation.

TABLE 3

| Shell (wt %) | | | | | TGA | |
|---|---|---|---|---|---|---|
| | | | | | | Mass |
| | | | | | Half- | Loss at |
| | | | | Silane | height | 300° C. |
| MAA | MMA | Styrene | iBOMA | A-174 | (° C.)[1] | (%)[2] |
| 11.5 | 0 | 37.5 | 0 | 9.5 | 360 | 7 |
| 11.5 | 37.5 | 0 | 0 | 9.5 | 370 | 7.4 |
| 11.5 | 0 | 0 | 37.5 | 9.5 | 347 | 10 |

Key
[1]Half height: this is the half-height of the decay curve.
[2]Mass loss @ 300° C.: this is the amount of material lost (expressed as a percentage) from the sample between the starting condition, 110° C., and 300° C.
MAA—methacrylic acid
MMA—methyl methacrylate
iBOMA—iso Bournyl methacrylate All preparations also contained difunctional acrylate as the remainder of the shell component.

As can be seen from the results, the effect of inclusion of the Silane is similar across a number of monomers with the exact degree of the effect varying by monomer type.

The invention claimed is:

1. A microcapsule comprising a core containing a hydrophobic liquid or wax and a polymeric shell formed from:
    i) 1 to 20% by weight of polymerisable silane compound, wherein the silane compound is defined by formula I

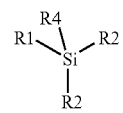

wherein R1 is selected from the group consisting of allyl, methallyl, acryloyloxyalkyl, methacryloyloxy bonded to an alkyl radical, acrylamidoalkyl and methacrylamidoalkyl, R2, R3 and R4 are each independently selected from $C_{1-5}$ alkoxy groups,
    ii) 1 to 94% by weight of hydrophobic mono functional ethylenically unsaturated monomer,
    iii) 5 to 98% by weight of polyfunctional ethylenically unsaturated monomer, and
    iv) 0 to 60% by weight of other mono functional monomer(s),
    wherein components (i), (ii), (iii) and (iv) total 100%, and in which the microcapsule also includes a hydrophilic polymer which is covalently bonded to the microcapsule, and
    wherein the hydrophilic polymer is present in an amount between 5 to 50% by weight based on the weight of the polymeric shell.

2. A microcapsule according to claim 1 comprising
    45 to 95% by weight hydrophobic oil or wax,
    5 to 65% by weight shell.

3. A microcapsule according to claim 1 in which the mono functional ethylenically unsaturated monomer is selected from styrene and $C_1$ to $C_{12}$ alkyl esters of acrylic acid and $C_1$ to $C_{12}$ alkyl esters of methacrylic acid.

4. A microcapsule according to claim 1 in which the polyfunctional ethylenically unsaturated monomer is an alkane diol diacrylate.

5. A microcapsule according to claim 1 in which the silane compound comprises at least one ethylenically unsaturated moiety and at least one alkoxy group bonded to a silicon atom.

6. A microcapsule according to claim 1 in which the hydrophilic polymer is a polymer which is reactive with the silane compound.

7. A microcapsule according to claim 1 in which the hydrophilic polymer is a water-soluble hydroxy containing polymer.

8. A microcapsule according to claim 7 in which the hydrophilic polymer is a polyvinyl alcohol.

9. A microcapsule according to claim 1 in which the hydrophobic liquid or wax is a hydrocarbon.

10. A microcapsule according to claim 1 in which the hydrophobic liquid or wax that has a melting point at a temperature between −30° C. and 150° C.

11. A microcapsule according to claim 1 in which in which the core contains an active ingredient selected from the group consisting of UV absorbers, UV reflectors, flame retardants, active dye tracer materials, pigments, dyes, colorants, scale inhibitors, corrosion inhibitors, antioxidants, pour point depressants, wax deposition inhibitors, dispersants, biocides, enzymes, detergent builders, fragrances, phase change materials and silicone oils.

12. A process of manufacturing microcapsules according to claim 1, comprising a core containing a hydrophobic liquid or wax and a polymeric shell, comprising the steps,
   1) providing a monomer blend comprising,
      i) 1 to 20% by weight of polymerisable silane compound,
      ii) 1 to 94 by weight of hydrophobic mono functional ethylenically unsaturated monomer,
      iii) 5 to 98% by weight of polyfunctional ethylenically unsaturated monomer, and
      iv) 0 to 60% by weight of other mono functional monomer(s),
   wherein components (i), (ii), (iii) and (iv) total 100%,
   2) combining the monomer mixture with the hydrophobic liquid or molten hydrophobic wax to form a monomer solution,
   3) forming an aqueous phase comprising a hydrophobic polymer which is reactive with the silane compound,
   4) homogenising the monomer solution into the aqueous phase containing to form an emulsion,
   5) subjecting the emulsion to polymerisation conditions, and
   6) polymerising the monomer to form a dispersion of microcapsules in the aqueous phase.

13. A process according to claim 12 which includes the features defined in claim 2.

14. A process according to claim 12 in which the monomer is subjected to free radical polymerization.

15. A process according to claim 12 in which a thermal initiator is combined with the monomer and the emulsion is heated to a temperature of at least 50° C. for sufficient time to effect polymerization.

16. A process according to claim 12 in which the hydrophilic polymer is a stabilising polymer.

17. A process according to claim 12 in which the stabilising polymer is a water-soluble hydroxy containing polymer.

18. A process according to claim 17 in which the emulsion is maintained at a temperature of between 50 and 80° C. for a period of between 90 and 150 minutes and then subjected to a temperature of at least 80° C. for a period of at least 30 minutes.

19. An article comprising microcapsules each comprising a core containing a hydrophobic liquid or wax and a polymeric shell formed from:
   i) 1 to 20% by weight of polymerisable silane compound, wherein the silane compound is defined by formula I

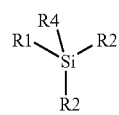

wherein R1 is selected from the group consisting of allyl, methallyl, acryloyloxyalkyl, methacryloyloxy bonded to an alkyl radical, acrylamidoalkyl and methacrylamidoalkyl, R2, R3 and R4 are each independently selected from $C_{1-5}$ alkoxy groups,
   ii) 1 to 94% by weight of hydrophobic mono functional ethylenically unsaturated monomer,
   iii) 5 to 98% by weight of polyfunctional ethylenically unsaturated monomer, and
   iv) 0 to 60% by weight of other mono functional monomer(s),
   wherein components (i), (ii), (iii) and (iv) total 100%,
and in which the microcapsule also includes a hydrophilic polymer which is covalently bonded to the microcapsule, and
   wherein the hydrophilic polymer is present in an amount between 5 to 50% by weight based on the weight of the polymeric shell.

20. A coating composition comprising microcapsules each comprising a core containing a hydrophobic liquid or wax and a polymeric shell formed from:
   i) 1 to 20% by weight of polymerisable silane compound, wherein the silane compound is defined by formula I

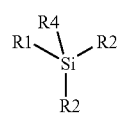

wherein R1 is selected from the group consisting of allyl, methallyl, acryloyloxyalkyl, methacryloyloxy bonded to an alkyl radical, acrylamidoalkyl and methacrylamidoalkyl, R2, R3 and R4 are each independently selected from $C_{1-5}$ alkoxy groups,
   ii) 1 to 94% by weight of hydrophobic mono functional ethylenically unsaturated monomer,
   iii) 5 to 98% by weight of polyfunctional ethylenically unsaturated monomer, and
   iv) 0 to 60% by weight of other mono functional monomer(s),
   wherein components (i), (ii), (iii) and (iv) total 100%,
and in which the microcapsule also includes a hydrophilic polymer which is covalently bonded to the microcapsule, and
   wherein the hydrophilic polymer is present in an amount between 5 to 50% by weight based on the weight of the polymeric shell.

21. A process of coating a fabric comprising the steps of
   A) providing a textile coating composition,
   B) applying the coating composition to a surface of the fabric, and
   C) drying the coating to provide a coated fabric,
   in which the coating composition comprises a particulate composition which comprises microcapsules according to claim 1, each comprising a core containing a hydrophobic liquid or wax and a polymeric shell formed from:
i) 1 to 20% by weight of polymerisable silane compound,
ii) 1 to 94% by weight of hydrophobic mono functional ethylenically unsaturated monomer,
iii) 5 to 98% by weight of polyfunctional ethylenically unsaturated monomer, and
iv) 0 to 60% by weight of other mono functional monomer(s), wherein components (i), (ii), (iii) and (iv) total 100%, and in which the microcapsule also includes a hydrophilic polymer which is covalently bonded to the microcapsule.

22. Fibres comprising microcapsules according to claim 1, each comprising a core containing a hydrophobic liquid or wax and a polymeric shell formed from:
i) 1 to 20% by weight of polymerisable silane compound,
ii) 1 to 94% by weight of hydrophobic mono functional ethylenically unsaturated monomer,
iii) 5 to 98% by weight of polyfunctional ethylenically unsaturated monomer, and
iv) 0 to 60% by weight of other mono functional monomer(s), wherein components (i), (ii), (iii) and (iv) total 100%, and in which the microcapsule also includes a hydrophilic polymer which is covalently bonded to the microcapsule.

* * * * *